(12) United States Patent
Stoeckmann (10) Patent No.: US 9,183,190 B2
(45) Date of Patent: Nov. 10, 2015

(54) METHODS AND SYSTEMS FOR DOCUMENT-BASED PUBLISHING CHANNELS

(75) Inventor: Jan Stoeckmann, Hamburg (DE)

(73) Assignee: Adobe Systems Incorporated, San Jose, CA (US)

(*) Notice: Subject to any disclaimer, the term of this patent is extended or adjusted under 35 U.S.C. 154(b) by 490 days.

(21) Appl. No.: 12/555,939

(22) Filed: Sep. 9, 2009

(65) Prior Publication Data

US 2014/0143660 A1    May 22, 2014

(51) Int. Cl.
*G06F 17/30* (2006.01)
*G06F 17/22* (2006.01)

(52) U.S. Cl.
CPC ........ *G06F 17/2276* (2013.01); *G06F 17/2205* (2013.01); *G06F 17/30* (2013.01)

(58) Field of Classification Search
CPC ............................ G06F 17/30569; G06F 17/30
USPC .......................................................... 715/255
See application file for complete search history.

(56) References Cited

U.S. PATENT DOCUMENTS

| | | | | |
|---|---|---|---|---|
| 6,816,893 B2 * | 11/2004 | Boaz et al. | ..................... | 709/218 |
| 7,770,180 B2 * | 8/2010 | Villaron et al. | ................ | 719/313 |
| 2004/0078434 A1 * | 4/2004 | Parker et al. | .................. | 709/206 |
| 2007/0204217 A1 * | 8/2007 | Ross et al. | ..................... | 715/523 |
| 2007/0266309 A1 * | 11/2007 | Sellman | ......................... | 715/513 |
| 2009/0327209 A1 * | 12/2009 | Dunietz et al. | .................... | 707/1 |

OTHER PUBLICATIONS

Microsoft Corporation, "The printer settings are ignored when you print a Word Document" (Article 904805), Dec. 12, 2006, available at http://support.microsoft.com/kb/904805 (last accessed Sep. 8, 2009).
Adobe Systems Incorporated, "Adobe Photoshop CS4 Scripting Guide," 2008.

* cited by examiner

*Primary Examiner* — Kavita Padmanabhan
*Assistant Examiner* — Tionna Burke
(74) *Attorney, Agent, or Firm* — Kilpatrick Townsend & Stockton LLP (57) ABSTRACT

An editing application can support publishing channels that are embedded in a document being edited. A publishing channel can include one or more publishing parameters usable to control how some or all of the content is exported by the editing application. A method can comprise loading a document in an editing environment provided by an editing application, receiving data identifying at least a portion of the document, receiving data defining a publishing channel to use in exporting the identified portion of the document, and storing data defining the instance of the publishing channel in the document alongside data defining the document. The document may comprise a plurality of objects and storing data can comprise storing data defining the instance of the publishing channel with respect to one or more of the objects included in the document.

23 Claims, 3 Drawing Sheets

METHODS AND SYSTEMS FOR DOCUMENT-BASED PUBLISHING CHANNELS

TECHNICAL FIELD

The disclosure below generally relates to media viewing and editing applications, particularly to handling export of media.

BACKGROUND

Editing applications can be used to generate visual, audio, textual, and other content data for various purposes. As an example, a graphic editing application such as Adobe® Photoshop® or Illustrator® can be used to edit a document comprising raster or vector graphic objects. A video editing application such as Adobe® Premiere Pro® may be used to edit a document comprising video and/or audio objects. As a further example, a web page or an application may include visual, video, audio, and textual content and can be developed using an editing application such as Adobe® Flash Builder™, Dreamweaver®, or Adobe® Fireworks. All of the editing applications noted above are available from Adobe Systems Incorporated of San Jose, Calif.; numerous other editing applications are available from other vendors.

When editing is complete, one option is to export content from a format native to the editing application to another format or medium. For example, vector or raster graphics may be converted into a bitmap, JPEG, or other image file for file export or may be converted into a data structure for use by a printer to print the graphics. As another example, a web page may be arranged in an editing application and its contents exported as an HTML file referencing graphics files that are also exported.

Although useful, aspects of editing applications can be tedious. For example, a developer may wish to export content from an editing application for a number of different purposes and may be slowed by adjusting export settings and making other selections. Although some editing applications retain the last-used export path (e.g., the last-used page settings for printing a word processor document), such a feature may be of minimal help to a developer using the same content for multiple different export scenarios.

SUMMARY

In accordance with one or more aspects of the present subject matter, an editing application can support publishing channels that are embedded in a document being edited. A publishing channel can define a plurality of publishing parameters usable to control how some or all of the content is exported by the editing application. An instance of the publishing channel can define particular values for those parameters. This may, for instance, allow a developer, designer, or other application user to define publishing scenarios once and easily use the publishing scenario(s) during different editing sessions.

Embodiments include a method comprising loading a document in an editing environment provided by an editing application, receiving data identifying at least a portion of the document, receiving data defining an instance of a publishing channel to use in exporting the identified portion of the document, and storing data defining the instance of the publishing channel in the document alongside data defining the document, with the instance of the publishing channel referencing the identified portion of the document. For example, the document may comprise a plurality of objects and storing data can comprise storing data defining the parameter values for the instance of the publishing channel with respect to one or more of the objects included in the document.

Embodiments include support for multiple instances of publishing channels for the same document. The multiple instances of publishing channels may be used in exporting some or all of the same logical units of the document and/or may be directed to different logical units. Additionally, different publishing channel types may be defined, and so the instances of publishing channels may be of different types.

For example, data defining an instance of a first publishing channel type with respect to a first object can be included in the document and data defining an instance of a second publishing channel type with respect to a second object can be included in the document. This may allow, for example, for different objects to be exported differently (e.g., using different file types, file qualities) or completely separately from one another. As another example, different publishing channels can be used to export the entire document, but using different parameters (e.g., a first channel to print the document, a second channel to export the document as a single JPEG file, and a third channel to export a plurality of high-quality image files of each component in the document). Additionally or alternatively, a document may contain multiple instances of the same publishing channel type, but with different parameter values as between the instances.

Embodiments also include systems and computer-readable media implementing one or more aspects of the present subject matter. These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Reference will now be made in detail to various and alternative exemplary embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations as come within the scope of the appended claims and their equivalents.

In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure the claimed subject matter.

Figure 1:
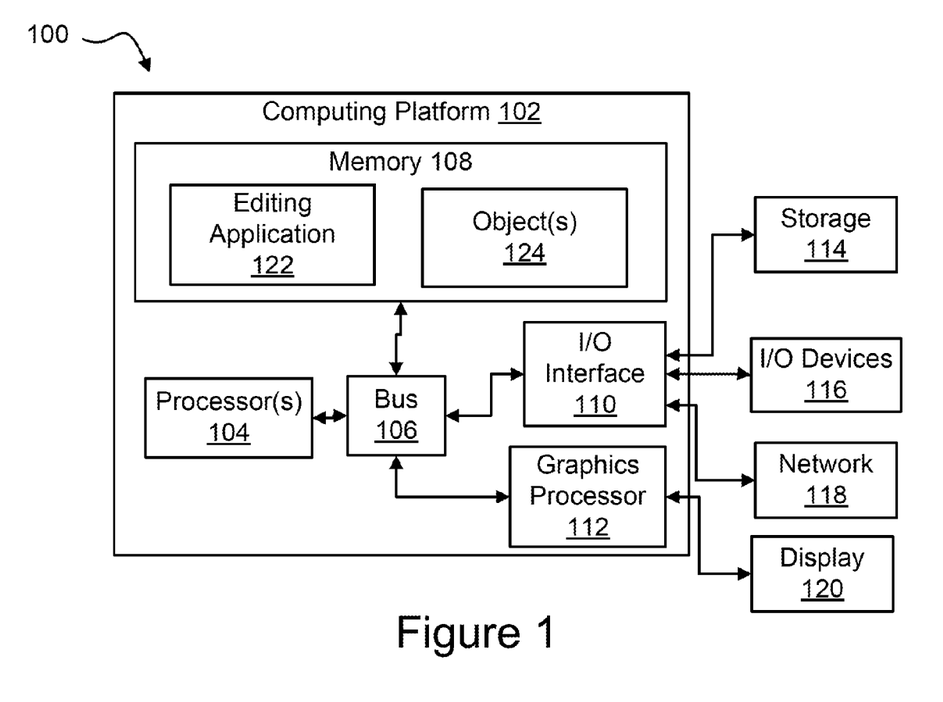
FIG. 1 is a block diagram illustrating an example of a computing system configured to support document-based publishing channels.

FIG. 1 is a block diagram illustrating an example of a computing system 100 configured to support document-based publishing channels. In this example, computing system 100 comprises a platform 102 having one or more processors 104 with access via bus 106 to a computer-readable medium 108 embodying program components that configure computing system 100 to function. In this example, the program components reside in memory, which can comprise RAM, ROM, Flash memory, or any other suitable storage medium. Additional components include input-output (I/O) handling components 110, a display 120, user input (UI) devices 116 (e.g., a mouse, keyboard, touch screen interface, etc.), one or more networking or other interfaces 118 (e.g., Ethernet, USB, etc.), and storage 114 (e.g., hard disk, optical drive(s)).

The program components include an editing application 122 and one or more objects 124. Of course, computing system 100 may be configured by other software such as multiple different editing applications 122, other applications, and/or an operating system. Computing system 100 is not intended to limit the use of the subject matter to the particular computer architecture shown. For instance, embodiments include a server computing system comprising one or more server devices could utilize an embodiment of an editing application 122 that is provided as a web service accessible by one or more client devices using a browser, a client-side rich internet application, or another client-side application to invoke the web service.

Generally speaking, an editing application 122 can include program code for accessing a document file, the document file comprising data identifying a plurality of logical units of the document. In this example, the logical units are represented as one or more objects 124. For example, the editing application can include suitable code for opening a file having content data for a visual document, with the visual document formed using a number of visual objects such as vector and/or raster graphics, graphic effects, and text arranged into different layers.

In accordance with the present subject matter, editing application 122 also includes program code for identifying a publishing parameter (or parameters) stored in the document file. The publishing parameter(s) can be used to determine how to export one or more logical units of the document by automatically providing export setting values for use by components of the editing application that handle export. For example, exporting can comprise providing data representing the at least one logical unit of the document by using the publishing parameter to determine at least one of a data format, a layout, or a desired location for the provided data.

In some embodiments, the publishing parameters are grouped into publishing channels that can be selected by a user. As will be noted below, a publishing channel may include parameters for exporting all or only some of the contents of a document. Different types of publishing channels may be supported—for example, a first type may include parameters for use in controlling one type of export operation, a second type may include parameters for controlling a different type of export operation, and so on.

As a specific example, the editing application can include program code for exporting at least one logical unit of the document based on a publishing parameter as is conventionally known, such as by converting various graphic elements into JPEG files upon selection of a file format and quality level (e.g., low, medium, and high). However, rather than relying on user input provided at the time of export to determine values for the file type and quality level parameters, the parameter values can be found in the document itself and can automatically be used when an instance of a publishing channel including the parameter values is selected.

The instance of the publishing channel may identify that only a subset of all of the objects are to be exported, and so the user may be spared having to manually select the subset each time he or she wishes to publish those objects. The publishing parameters may also specify how the objects are to be arranged for output. As an example, publishing parameters may identify a layout for printing and/or for combining different objects into a single file. As another example, the publishing parameters may identify that different objects are to be output into different files, along with file type and quality characteristics for each file.

As a further example, publishing parameters may be defined with respect to other logical units of a document. For example, a user may select one or more portions of an object or a group of objects and define a publishing channel instance applicable to the selected portion of the object or group of objects. For instance, the document may comprise a spreadsheet or a word processing document and the logical units may comprise a series of cells in the spreadsheet or a series of textual or other elements in the word processing document. These portions may be exported quickly and easily in some embodiments by selection of the corresponding publishing channel.

It will be appreciated that a number of different publishing parameters can be supported. The particular parameters stored in a document may vary as between different editing applications, or the editing applications may utilize a common format for some or all parameters.

A publishing channel can specify parameters applicable to the entire export operation and/or applicable to the logical unit(s) that are to be exported. For instance, for purposes of the export operation, publishing parameters can include data identifying which of several objects or other logical units are to be exported when a particular channel is selected. For instance, content of a document may include both static and animated/video elements. A "print" publishing channel may include only the static elements, while a "web" or "video" publishing channel may include the static and animated video elements. Another publishing channel may include all elements of a document.

Examples of publishing parameters include, but are not limited to, the parameters noted in the table below, which may be applied to logical units of a document and/or the document as a while when exported:

| Parameter Name | Example of use |
| --- | --- |
| File type | Specifies type of file for storing data that is exported |

-continued

| Parameter Name | Example of use |
|---|---|
| Margin | Specifies margin for export using print or an electronic document |
| Invisible | True/false value for specifying whether logical unit to be visible if exported |
| Animated | True/false value for freezing an animated element for export |
| File quality | Specify file quality/size for use in export |
| Rel-Location | Specifies location of logical unit relative to page/file boundaries |
| File location | Specifies file location to store exported data |
| Print | Identifies printer path to print exported data |
| Print-settings | Identifies printer color, margin, paper, or other settings for export |
| Color profile | Set color profile for image file |
| Transparency | Set transparency for image file |
| Pixel Bit Depth | Set bit depth for image file |
| FTP server address | Address to which file is to be exported |
| FTP username/password | Login information for server to which file is exported |
| PDF-Title | Title for PDF export |
| PDF-Author | Author for PDF export |
| PDF-Subject | Subject for PDF export |
| Version | Version of output format to use |
| SWF-Player Version | Version of Flash(R) Player to use |
| Background color | Background color for image/SWF file |
| Compression | Indicator of whether to output compressed or uncompressed file |

As indicated in the exemplary table above, parameters of publishing channels may be used to directly affect the exported content and/or can be used to set metadata values appended to the file. Other information such as file names, access restrictions (e.g., passwords), encryption, and the like may also be defined as parameters of a publishing channel.

Figure 2:
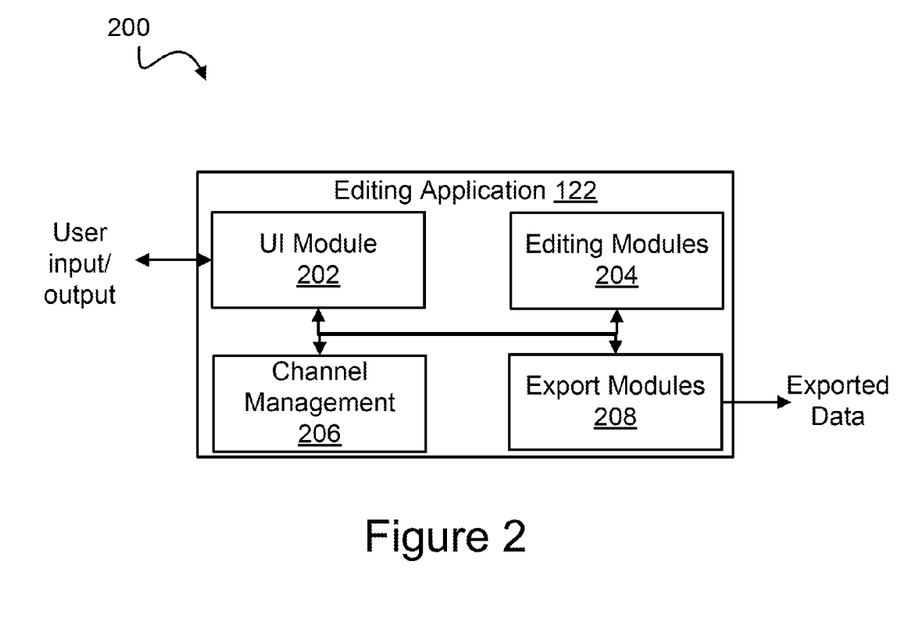
FIG. 2 is a diagram illustrating an exemplary software architecture for an editing application that supports document-based publishing channels.

FIG. 2 is a diagram illustrating an example software architecture for an editing application 122 that supports document-based publishing channels. In this example, editing application 122 includes a user interface (UI) module 202, one or more editing modules 204, a channel management module 206, and one or more export modules 208. This architecture is for purposes of example only and, in practice, an editing application can be configured with more or fewer modules or other program components than those illustrated here.

UI module 202 configures the computing system utilizing application 122 to provide an interface to receive input data and to generate a visual representation of content of a document, the content of the document stored in a file accessible by the computing system. For example, UI module 202 can comprise code that generates a graphical user interface comprising one or more windows for manipulating visual representations of the content via pointer gestures (e.g., clicks, drags, etc.), keyboard input, or other input.

Depending on the configuration and capabilities of the editing application, the user interface can include tool palettes for selecting different tools (e.g., cut, paste, paint, fill, etc.) to edit document content and a layers palette if the document includes different layers. If editing application 122 is used to edit dynamic content (e.g., video, animated, or interactive content that changes over time), UI module 202 may include a timeline control so that different frames or other sub units can be accessed to change the sequence or flow of the dynamic content.

Editing module 204 represents one or more program components configured to change the content of the document in response to the input data. For example, editing module 204 can include one or more programmatic methods, operations, or functions that change data defining the appearance, arrangement, or other characteristics of the document content in response to input data. For instance, editing module 204 may include suitable algorithms to draw a vectorized expression of a curve in response to inputs provided via a curve tool presented in the user interface. Operation of the editing components should be known to one of skill in the art and further detail is not included herein so as not to obscure the present subject matter.

In some embodiments, editing module(s) 204 can be omitted, such as if application 122 is intended only for viewing and exporting documents. For example, a web-based version of editing application 122 may allow for limited or no editing of documents, but may allow a user to define/utilize publishing channels embedded in the document.

In accordance with aspects of the present subject matter, editing application 122 includes a channel management module 206 that configures the computing system to access one or more instances of one or more publishing channels embedded in the file for the document. The instance(s) of the publishing channel(s) can each comprise one or more publishing parameters specifying how the document or a portion thereof is to be exported and values for the parameters.

Export module(s) 208 represent code or components of editing application 122 that are configured to export data representing at least a portion of the document. For example, an export module can include one or more algorithms to transform data stored in a format native to editing application 122 into another format, such as converting a *.PSD document in the native format for Adobe® Photoshop® into a JPEG, GIF, PNG, BMP, or other image file. As another example, the native format may represent a standard format, such as JPEG, with the data converted to another format (such as GIF) and/or into an application-specific format, such as *PSD.

As a further example, an export module can use data in a format native to the editing application to print the document or portions thereof. For instance, data representing an image, textual content, or other document content can be laid out into one or more pages based on page layout parameters such as page size, margin, fonts, and raster images.

In accordance with the present subject matter, channel management module 206 coordinates the operation of export module(s) 208 based on the parameter value(s) included in one or more instances of publishing channels embedded in a document.

For example, channel management module 206 may access a document's file to identify which publishing channel(s), if any, are defined for a document based on checking one or more portions of the document's file. Tie publishing channel data can be stored in working memory for the editing application and used by UI module 202 to present a selection interface (e.g., a menu) in which a user can select one or more publishing channels for use. Upon selection of one or more channels, channel management module 206 can invoke the appropriate export module(s) 208 and pass parameter values to effect an export operation based on the selected publishing channel(s).

Channel management module 206 may also define new instances of publishing channels or adjust parameter values for a previously-defined instance of a publishing channel. For example, user interface module 202 can be used to provide a publishing channel definition such as a dialog box configured to receive user input selecting a publishing channel type and further input setting values for the parameters associated with the type. Channel management module 206 can be configured to store the specified publishing parameter(s) in the document at appropriate locations.

In some embodiments, the channel management module has access to data defining a set of publishing channel types, such as a different class for each publishing channel type. An example of a publishing channel type is the JPEG file channel type. Parameters can include the file location and level of compression. The channel types supported by an application may be extensible, such as by providing additional code via a plugin or another program component. Continuing with the example above, channel management module 206 can create one or more instances of the JPEG file channel type in response to user input. An example is noted in the table below showing three different instances of the JPEG publishing channel type:

| Instance Number | File Location Parameter Value | Compression Parameter Value |
|---|---|---|
| 1 | C:\file.jpg | 50% |
| 2 | FTP:\\host.org\file.jpg | 25% |
| 3 | C:\file-high-quality.jpg | 10% |

In some embodiments, an editing application can support storing "favorite" publishing channel instances for later application to documents. For example, after an instance of a publishing channel type is defined with respect to a first document, data identifying the channel type and parameter values can be stored. When a second document is edited, the stored channel type and parameter values can be selected and used to define an instance of the publishing channel with respect to the second document or a portion thereof.

As was mentioned above, embodiments include editing applications implemented as a web service. In some such embodiments, client-side UI and data storage aspects can be handled by appropriate client-side code that generates a user interface, receives input data, stores/accesses local files, and relays data to and from server-side components of the web service. At the server side, appropriate code/modules can interface with the clients and invoke server-hosted channel management, export, and editing functionality.

Figure 3:
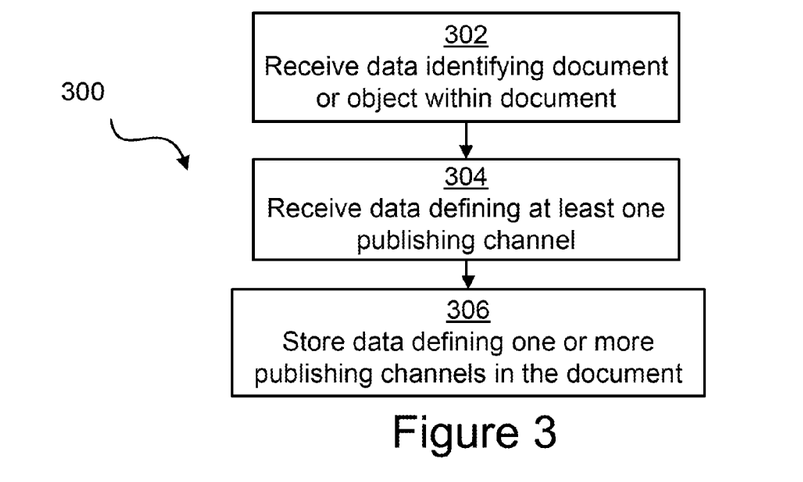
FIG. 3 is a flowchart showing steps of an exemplary method of storing publishing channel information in a document.

FIG. 3 is a flowchart showing an exemplary method 300 of storing publishing channel information in a document. Block 302 represents receiving data identifying a document and/or an object (or other logical unit) within the document. For example, a user may open one or more documents in an editing application and select a "publishing channels" option with respect to an entire document. As another example, the user may select one or more objects or other logical units of content within a document.

Block 304 represents receiving data defining at least one instance of a publishing channel. For example, if the user elects to define a new instance of a publishing channel, the editing application may present a user interface where the user can select the channel type and then add one or more parameter values to use in association with the channel. For instance, the user may select several objects and then specify a file type, quality, and location for use in exporting the objects in the same file or in different files; the publishing parameters may include the user's selection between a single and multiple files for export. As another example, the user may select several objects and specify a "print" publishing channel. The "print" publishing channel may simply specify use of the local printer and/or may specify a particular printer at a local or other location along with printer settings, page layout options, and the like.

Block 306 represents storing data defining one or more instances of publishing channels in the document. For example, the document may be stored in a structured file, such as an XML-formatted data structure. Publishing channel instances can be defined with respect to the entire file and/or with respect to logical units (e.g., objects) stored within the file. For instance, suitable XML markup can be included in the XML-formatted data structure to define the publishing channel(s) by name, declare parameters, and set parameter values.

Figure 4:
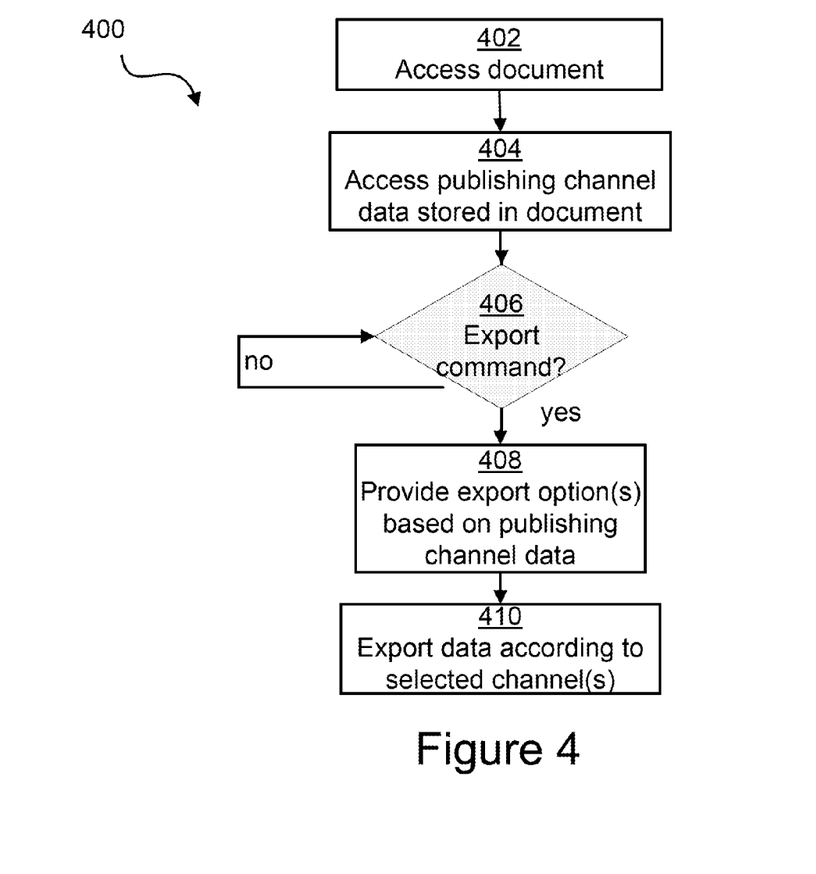
FIG. 4 is a flowchart showing steps of an exemplary method of using stored publishing channel information to export a document or one or more portions of a document.

FIG. 4 is a flowchart showing an exemplary method 400 of using stored publishing channel information to export a document or one or more portions of a document. Block 402 represents accessing the document. For instance, a user may specify a file location when opening the document in an editing application.

Block 404 represents accessing publishing channel data stored in the document. This may be achieved, for example, by identifying one or more portions within the document data structure in which publishing channels are defined in terms of one or more publishing parameters. As an example, an XML Schema may be used to recognize tags and other markup identifying the publishing channels in an XML-based file.

Block 406 represents awaiting an export command. In this example, data defining the publishing channels for the document are loaded into local memory when the document is loaded, with the publishing channel data ready for use when an export command is received. In other embodiments, the publishing channel data may be loaded separately when/if an export command is received. As another example, publishing channel data may be recognized using an offset value relative to an address of the document file.

Once the export command is received, export options are provided as shown at block 408 based on the publishing channel data. For example, a menu option for selecting from a plurality of previously-defined publishing channels may be presented listing the names of the publishing channels along with an option to define a new channel or edit the existing channels. Upon selection of one or more of the channels, then as shown at block 410 the content of the document can be exported according to the publishing channel data.

As noted above, exporting can comprise outputting data that changes the format and/or medium of the content from the format used by the editing application. For example, a "print" publishing channel may export data by directing the editing application to convert the visual content of the document into a bitstream and directing the bitstream to a printing resource as is known in the art. However, in accordance with the present subject matter, the margin, layout, paper size, printer selection, and/or other printing resource parameters can be set by the publishing channel. For example, a first "print" publishing channel may specify generation of color content while a second "print" publishing channel may specify generation of black and white content. When the second channel is selected, the editing application can pass suitable parameters to its export components so that the document content is printed in black and white.

Figure 5:
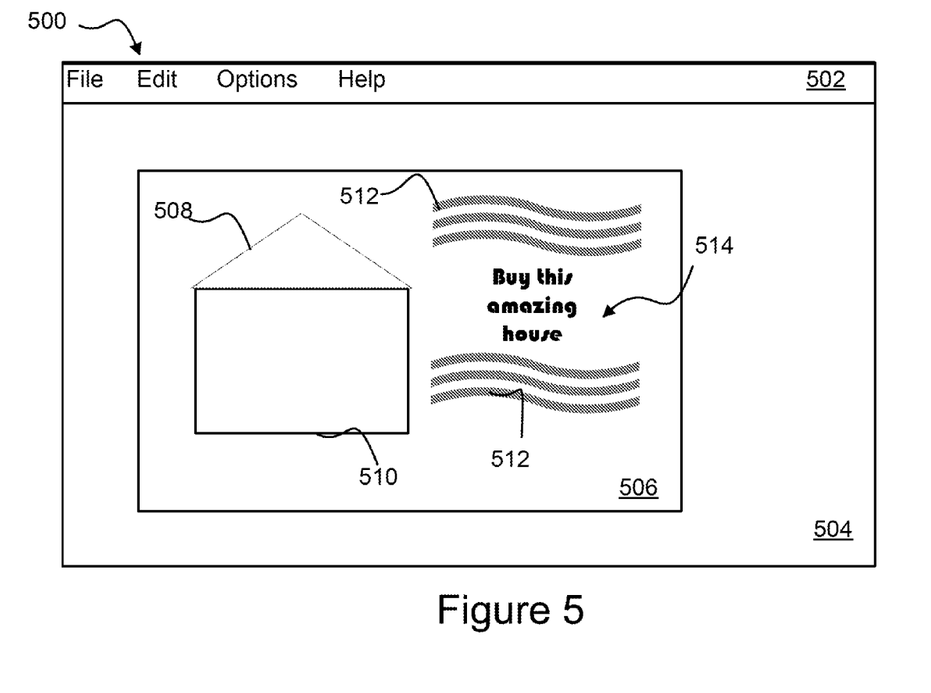
FIG. 5 is a diagram illustrating an exemplary user interface of an editing application.

FIG. 5 is a diagram illustrating an exemplary user interface 500 of an editing application. In this example, the user interface includes a menu bar 502 and editing canvas 504. A window 506 in editing canvas 504 depicts content of a document being edited. In this example, the content includes visual content comprising an advertisement for a house. The content may include associated audio as well. For instance, an icon (not shown) may represent one or more sound effects associated with the visual elements.

In this example, the content includes a first shape 508 and a second shape 510 used to depict the house. These elements may comprise vector or raster graphics. For example, first shape 508 may comprise a triangle vector object with a gradient fill pattern. Wave elements 512 bracket text 514 ("Buy this amazing house") and may, for example, comprise animated elements. As an example, editing application 500 may be used to develop content a rich internet application or presentation, such as a SWF file for use with the Adobe® Flash® Player.

However, the editing application that provides interface 500 may support other export options, and the options can be specified via publishing channels as taught herein. For example, a "Flash" publishing channel may specify that elements 508-514 and the audio element are to be published as elements of a SWF file. A "Print" publishing channel may specify that elements 508, 510, and 514 are to be laid out on a page along with page margins and characteristics for use in printing a flyer. In the "Print" publishing channel, animated wave elements 512 may be omitted entirely or may be noted with parameters indicating a particular state (e.g., a frame) for use in printing the flyer. A "Low-Quality" publishing channel may specify that elements 508-514 are to be laid out into a single, small-sized JPEG or other image file for use in generating an icon, thumbnail, or other lower-resolution rendering of the content.

Figure 6:
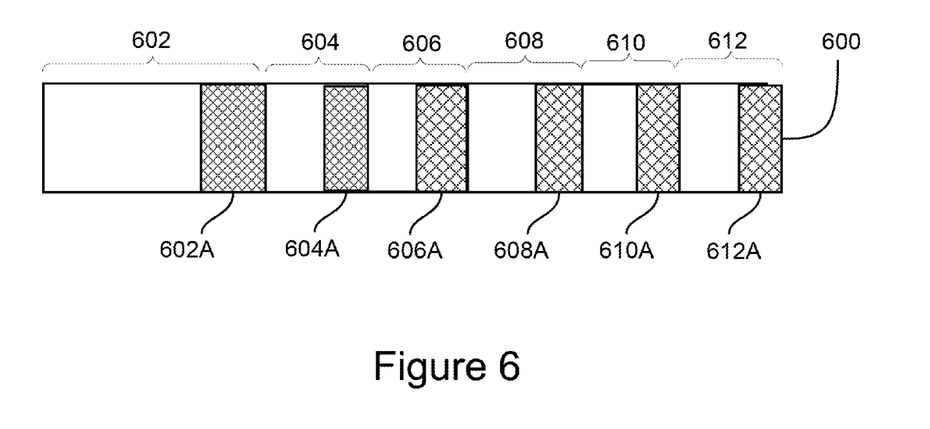
FIG. 6 is a diagram showing an exemplary data structure including object data of a document and publishing channel data.

FIG. 6 is a diagram showing an exemplary data structure 600 including object data of a document and publishing channel data. Although illustrated as a continuous segment, data structure 600 is not meant to imply how the data is physically stored; rather, it is presented as a non-limiting illustration of a suitable logical structure for use in implementing an embodiment of the present subject matter. Portions 602-612 can comprise logical portions of the document. For example, portion 602 may include file information for the entire document, while portions 604, 606, 608, 610, and 612 may each correspond to data defining content of an object or other logical unit. For instance, portions 602-612 may each correspond to a tag-delimited portion of an XML document and/or binary data defining object shapes or colors. As another example, the data may define text strings, fonts, and other document formatting and layout information.

As shown in FIG. 6, each portion 602-612 features embedded publishing channel data 602A, 604A, 606A, 608A, 610A, and 612A. For example, publishing channel data 602A may comprise one or more parameters and parameter values defining publishing channels for use in publishing some or all of the document, such as data to identify particular logical units as included in or excluded from the various publishing channels. If selection of a part of an object (e.g., selection of a run of text, spreadsheet columns, etc.) is supported, data 602A may indicate the selection bounds for the publishing channel.

Portions 604A, 606A, 608A, 610A, and 612A may comprise publishing channels and/or parameters defined with respect to particular objects. For example, the object(s) represented by portion 608 may include separate publishing channels defined at 608A. Publishing channels and parameter-value pairs may be defined using suitable syntax. For instance, if data structure 600 comprises an XML document, publishing channels may be defined in the XML schema for inclusion alongside content data defined in the XML document.

General Consideration

Some portions of the detailed description were presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here and generally is considered to be a self-consistent sequence of operations or similar processing leading to a desired result. In this context, operations or processing involve physical manipulation of physical quantities.

Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the foregoing discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

As noted above, a computing device may access one or more computer-readable media that tangibly embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, televisions, television set-top boxes, portable music players, and consumer electronic devices such as cameras, camcorders, and mobile devices. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components or systems. It should be appreciated that such communications may occur over any suitable number or type of networks or links, including, but not limited to, a dial-in network, a local area network (LAN), wide area network (WAN), public switched telephone network (PSTN), the Internet, an intranet or any combination of hard-wired and/or wireless communication links.

Any suitable tangible computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A method, comprising:
   loading a document in an editing environment provided by an editing application;
   receiving data identifying at least a portion of the document, wherein the identified portion of the document includes a format native to the editing application;
   receiving user input defining an instance of a publishing channel to use in exporting the identified portion of the document, the user input specifying a selected type of the publishing channel and an export setting value associated with the publishing channel, the publishing channel comprising a publishing parameter specifying how the identified portion of the document is to be exported, the publishing parameter comprising the export setting value, the export setting value usable by the editing application to define an exportable version of the portion of the document to be used in the exporting, wherein the exporting includes transforming the format native to the editing application to a second format for use by an additional application, wherein the exporting further includes using the publishing parameter to identify a subset of a plurality of objects included in the document for exporting in the exportable version; and
   storing data defining the instance of the publishing channel as an object embedded in the document alongside one or more objects embedded in the document and defining the exportable version of the portion of the document, the data defining the instance of the publishing channel comprising the publishing parameter specifying the export setting value, the object referencing the portion of the document and a value for the export setting value.

2. The method set forth in claim 1, wherein storing data comprises storing data defining an instance of a first publishing channel type with respect to a first object embedded in the document and an instance of a second publishing channel type with respect to a second object embedded in the document, the first and second publishing channel types being different from one another, wherein the first publishing channel type comprises a first set of publishing parameters for use in controlling a first type of export operation, and wherein the second publishing channel type comprises a second set of publishing parameters for use in controlling a second type of export operation.

3. The method set forth in claim 1, further comprising:
   receiving an export command identifying at least a portion of the document and specifying at least one publishing channel instance; and
   exporting the identified portion of the document using export setting values comprised in the specified publishing channel instance.

4. The method set forth in claim 1, wherein the export settings value are defined with respect to each of a subset of a plurality of objects comprising the document, and
   wherein the method further comprises:
   receiving an export command to export the subset; and
   exporting each of the plurality of objects of the subset using the respective publishing parameter value for the object.

5. The method of claim 1, wherein the exporting setting value comprises a value related to at least one of a file type, a file quality, and a file location.

6. The method of claim 1, wherein the export setting value comprises at least one of a transparency value, a pixel depth value, and a color profile.

7. The method of claim 1, wherein the export setting value comprises at least one of a file transfer protocol (FTP) server address, a FTP username, and a FTP password.

8. The method of claim 2, wherein the first type of export operation is associated with a first application-specific format and wherein the second type of export operation is associated with a second application-specific format, wherein either the first application-specific format or the second application-specific format include a layout for printing.

9. A computing system comprising a processor with access to a computer-readable medium embodying program components, the program components comprising:
   a user interface module that configures the computing system to provide an interface to receive input data of a user and to generate a visual representation of content of a document, the content of the document stored in a file accessible by the computing system;
   a channel management module that configures the computing system to access data defining an instance of a publishing channel embedded in the file and comprising a publishing parameter embedded in the file based on the input data of the user and specifying an export setting value for use by an editing application to specify an exportable version of at least a portion of the document as part of exporting the at least a portion of the document, wherein the at least a portion of the document includes a format native to an editing application, wherein the exporting includes identifying a subset of a plurality of objects included in the document for exporting in the exportable version based on the publishing parameter, wherein the data defining the instance of the publishing channel is embedded as an object in the file alongside the subset of the plurality of objects, wherein the object references the at least a portion of the document and the export setting value; and an export module configured to automatically export data representing the at least a portion of the document based on the export setting value embedded in the file by transforming the format native to the editing application to a second format for use by an additional application.

10. The computing system set forth in claim 9, wherein the program components further comprise:

an editing module configured to change the content of the document in response to the input data.

11. The computing system set forth in claim 9, wherein the user interface module configures the computing system to provide a selection interface identifying a plurality of publishing channel instances and adapted to receive selection of a publishing channel instance, and wherein the export module is configured to export data representing the at least a portion of the document based on the publishing parameter associated with the selected publishing channel instance.

12. The computing system set forth in claim 9, wherein the user interface module configures the computing system to provide a publishing channel definition interface, the publishing channel definition interface configured to receive user input specifying a selected type of the publishing channel and the export setting value to define the instance of the publishing channel, and wherein the channel management module is configured to store the publishing parameter comprising the export setting value as an object embedded in the document.

13. The computing system set forth in claim 9, wherein the publishing parameter comprises a file type characteristic to use in exporting or a location characteristic to use in exporting.

14. The computing system set forth in claim 9, wherein the publishing parameter is specified with respect to the entire document.

15. The computing system set forth in claim 9, wherein the publishing parameter is specified with respect to a logical portion of the document.

16. The computing system set forth in claim 15, wherein the logical portion of the document comprises an object of the document.

17. A computer program product comprising program code embodied in a non-transitory computer-readable medium, the program code comprising:

program code for accessing a document, the document comprising data identifying a plurality of logical units of the document;

program code for identifying a type of an instance of a publishing channel stored in the document and a publishing parameter included in the instance, wherein the publishing parameter is embedded in the document as a logical unit and specifies an export setting value based on user input related to the export setting value, the export setting value for use by an editing application to define an exportable version of at least one logical unit of the document to be used in exporting the document, wherein the logical unit is embedded alongside the at least one logical unit of the document and references the exportable version and the export setting value;

program code for automatically exporting the at least one logical unit of the document based on the type and the publishing parameter embedded in the document, wherein the exporting further includes identifying the at least one logical unit for exporting in the exportable version based on the publishing parameter, wherein the at least one logical unit of the document includes a format native to the editing application, wherein exporting comprises:

providing data representing the at least one logical unit of the document by using the type to determine an export operation to use and by using the export setting value indicated by the publishing parameter embedded in the document to determine at least one of a data format, a layout, or a desired location for the provided data, and transforming the format native to the editing application to a second format for use by an additional application.

18. The computer program product set forth in claim 17, wherein the logical unit comprises an object comprising a graphical or textual element of the document.

19. The computer program product set forth in claim 18, wherein the logical unit comprises a selected portion of an object in the document.

20. The computer program product set forth in claim 17, wherein exporting comprises using the publishing parameter to determine a formatting characteristic to use in printing at least a portion of the document.

21. The computer program product set forth in claim 17, wherein exporting comprises using the publishing parameter to determine an image file type to use in saving a file representing at least a portion of the document.

22. The computer program product set forth in claim 17, wherein exporting comprises using the publishing parameter to identify a subset of a plurality of objects included in the document.

23. The computer program product set forth in claim 22, wherein exporting further comprises using a publishing parameter associated with each object of the subset to determine how the object is to be exported.

* * * * *